US011614765B2

(12) United States Patent
Miller et al.

(10) Patent No.: US 11,614,765 B2
(45) Date of Patent: Mar. 28, 2023

(54) VEHICLE PEDAL INCLUDING REDUNDANT DUAL OUTPUT INDUCTIVE POSITION SENSOR WITH REDUCED COUPLING COIL CIRCUITS

(71) Applicant: CTS Corporation, Lisle, IL (US)

(72) Inventors: Tad L. Miller, Elkhart, IN (US); Xiaofeng Huang, Chicago, IL (US)

(73) Assignee: CTS Corporation, Lisle, IL (US)

( * ) Notice: Subject to any disclaimer, the term of this patent is extended or adjusted under 35 U.S.C. 154(b) by 172 days.

(21) Appl. No.: 17/171,108

(22) Filed: Feb. 9, 2021

(65) Prior Publication Data

US 2021/0255657 A1 Aug. 19, 2021

Related U.S. Application Data

(60) Provisional application No. 62/976,787, filed on Feb. 14, 2020.

(51) Int. Cl.
*G05G 1/38* (2008.04)
*G01D 5/20* (2006.01)
(Continued)

(52) U.S. Cl.
CPC ............... *G05G 1/38* (2013.01); *B60K 26/02* (2013.01); *G01D 5/2053* (2013.01); *G05G 1/44* (2013.01); *H01F 17/0006* (2013.01)

(58) Field of Classification Search
CPC .... G01D 5/2053; G01D 5/2046; G01D 5/204; G01D 5/2086; G01D 5/202;
(Continued)

(56) References Cited

U.S. PATENT DOCUMENTS 7,292,026 B2    11/2007   Lee
7,482,803 B2     1/2009   Lee et al.
(Continued)

FOREIGN PATENT DOCUMENTS

DE    102015220617 A1    4/2017
DE    102017210655 A1    12/2018
WO       2006/106421 A2    10/2006

OTHER PUBLICATIONS

Datlinger C, Hirz M. Benchmark of Rotor Position Sensor Technologies for Application in Automotive Electric Drive Trains. Electronics. 2020; 9(7):1063. https://doi.org/10.3390/electronics9071063.

(Continued)

*Primary Examiner* — Brian J McGovern
(74) *Attorney, Agent, or Firm* — Michael Best & Friedrich LLP (57) ABSTRACT

A vehicle pedal assembly comprising a pedal housing, a rotatable pedal, and an inductive position sensor. The inductive position sensor includes an inductive sensor target rotatable in response to the rotation of the pedal and a substrate positioned opposite the inductive sensor target. First and second redundant inductive transmit and receiver coil circuits are defined and located on different sections of the substrate in a relationship with the respective receiver coil circuits of the first and second transmit and receiver coil circuits at least partially surrounded by the respective transmit coil circuits of the first and second transmit and receiver coil circuits for reducing the coupling factor between the first and second transmit and receiver coil circuits.

20 Claims, 6 Drawing Sheets

(51) Int. Cl.
   *B60K 26/02* (2006.01)
   *G05G 1/44* (2008.04)
   *H01F 17/00* (2006.01)

(58) Field of Classification Search
   CPC .... G01D 5/2033; G01D 5/2275; H01F 5/003;
   H01F 17/0006; B60K 26/02
   See application file for complete search history.

(56) References Cited

U.S. PATENT DOCUMENTS

| | | | |
|---|---|---|---|
| 7,538,544 B2 | 5/2009 | Lee | |
| 7,911,354 B2 | 3/2011 | Kim | |
| 8,508,242 B2 | 8/2013 | Shao et al. | |
| 8,542,007 B2 | 9/2013 | Brands et al. | |
| 9,958,293 B2 | 5/2018 | Elliott et al. | |
| 2005/0225320 A1 | 10/2005 | Lee | |
| 2006/0232269 A1* | 10/2006 | Sills | G01D 5/2283 |
| | | | 341/20 |
| 2008/0007251 A1 | 1/2008 | Lee | |
| 2010/0231206 A1* | 9/2010 | Kobayashi | G01B 7/30 |
| | | | 324/207.25 |
| 2013/0069637 A1* | 3/2013 | Kobayashi | G01D 5/208 |
| | | | 324/207.17 |
| 2015/0301084 A1* | 10/2015 | Elliott | G01D 5/20 |
| | | | 324/207.2 |
| 2017/0210227 A1* | 7/2017 | Chapman | G05G 1/44 |
| 2019/0242725 A1* | 8/2019 | Shaga | G01D 3/08 |
| 2020/0033161 A9 | 1/2020 | Elliott | |
| 2020/0072643 A1* | 3/2020 | Qama | G01D 5/2053 |
| 2020/0132874 A1* | 4/2020 | Witts | H01F 21/10 |
| 2020/0200569 A1 | 6/2020 | Utermoehlen et al. | |
| 2021/0239494 A1* | 8/2021 | Elliott | G01D 5/204 |
| 2022/0136869 A1* | 5/2022 | Shaga | G01D 5/2073 |
| | | | 324/207.17 |
| 2022/0178672 A1* | 6/2022 | Heinemann | G01B 7/30 |
| 2022/0187335 A1* | 6/2022 | Shaga | G01D 5/2053 |

OTHER PUBLICATIONS

IDT-Renesas Inductive Transmit/Receive Coil Circuit, Dec. 2019.
Microsemi-Microchip Inductive Transmit/Receive Coil Circuit, Sep. 2019.

\* cited by examiner

VEHICLE PEDAL INCLUDING REDUNDANT DUAL OUTPUT INDUCTIVE POSITION SENSOR WITH REDUCED COUPLING COIL CIRCUITS

CROSS-REFERENCE TO RELATED APPLICATIONS

This patent application claims priority and benefit of the filing date of U.S. Provisional Patent Application Ser. No. 62/976,787 filed on Feb. 14, 2020, the disclosure and contents of which are expressly incorporated herein in their entireties by reference.

FIELD OF THE INVENTION

The present invention relates generally to a vehicle pedal and, in particular, to a vehicle accelerator pedal including a redundant dual output inductive position sensor with reduced coupling transmit and receiver coil circuits.

BACKGROUND OF THE INVENTION

Figure 3A:
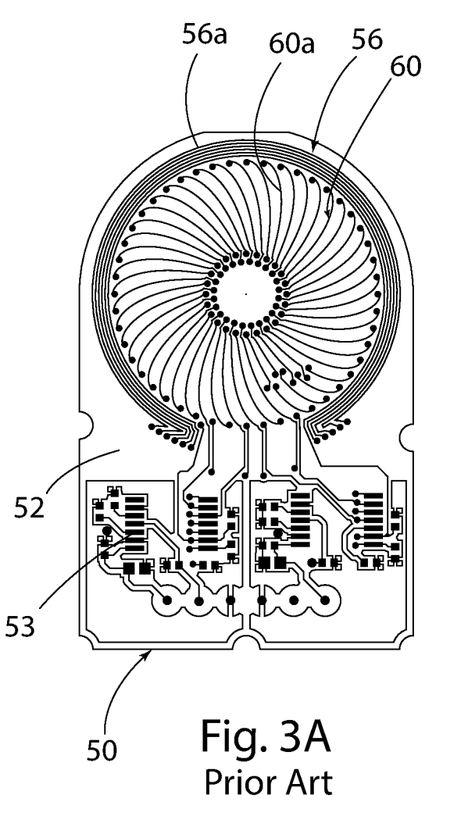
FIG. 3A is a plan view of the inductive transmit/receiver coil circuit on the front exterior face of a substrate of a prior art inductive position sensor.
Figure 3B:
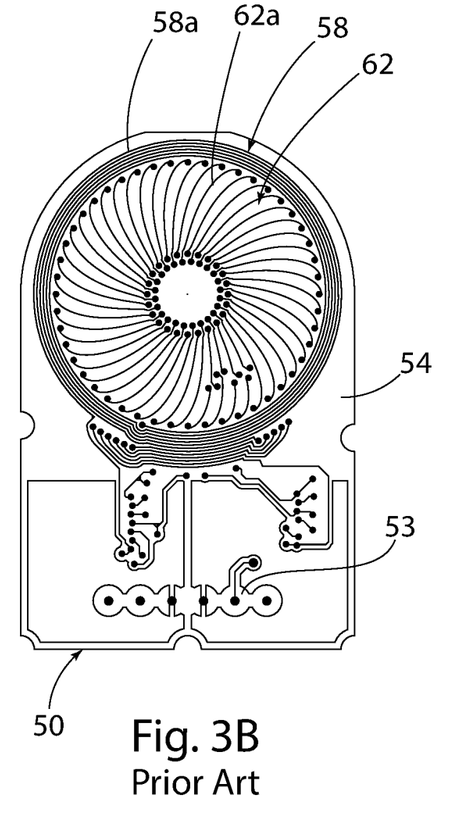
FIG. 3B is a plan view of the inductive transmit/receiver coil circuit on the opposed back exterior face of the substrate of the prior art inductive position sensor shown in FIG. 3A.
Figure 4A:
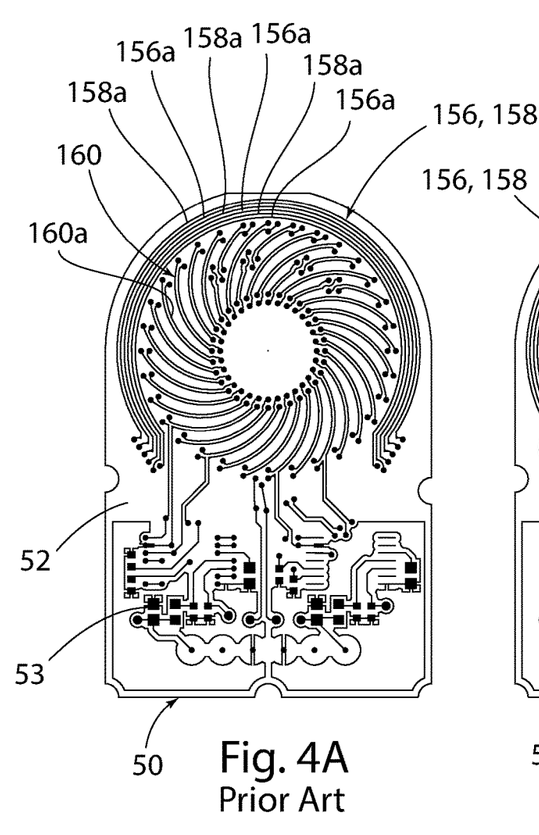
FIG. 4A is a plan view of the inductive transmit/receiver coil circuit on the front exterior face of a substrate of another prior art inductive position sensor.
Figure 4B:
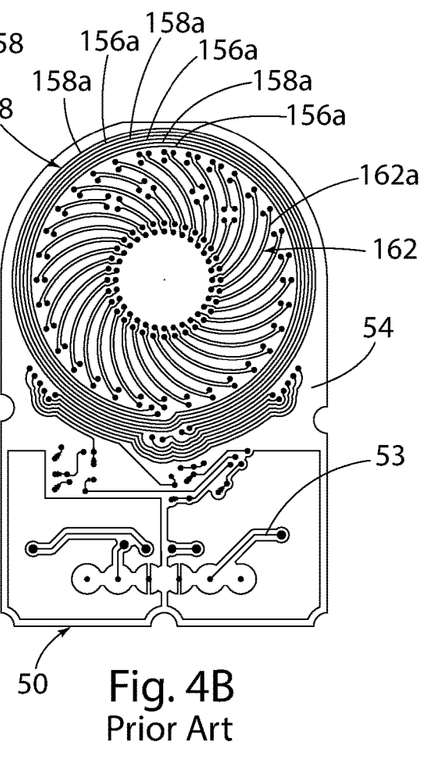
FIG. 4B is a plan view of the inductive transmit/receiver coil circuit on the opposed back exterior face of the substrate of the prior art inductive position sensor shown in FIG. 4A.

Vehicle accelerator pedals with redundant dual output inductive sensors for sensing the position of the pedal are known in the art and incorporate transmit and receiver coil circuits of the type shown in FIGS. 3 and 4 herein.

The present invention is directed to a vehicle accelerator pedal including redundant dual output inductive position sensors with reduced coupling transmit and receive coil circuits.

SUMMARY OF THE INVENTION

The present invention is generally directed to a vehicle pedal assembly comprising a pedal housing, a rotatable pedal, and an inductive position sensor including an inductive sensor target rotatable in response to the rotation of the pedal, a substrate positioned opposite the inductive sensor target, a first inductive transmit and receiver coil circuit defined on the substrate, and a second inductive transmit and receiver coil circuit defined and positioned on the substrate in a relationship relative to the first inductive transmit and receiver coil circuit which reduces a coupling factor between the first and second inductive transmit and receiver coil circuits.

In one embodiment, the first and second inductive transmit and receiver coil circuits are defined and positioned on different sections of the substrate in a relationship with the respective receiver coil circuits of the first and second transmit and receiver coil circuits at least partially surrounded by the respective transmit coil circuits of the first and second transmit and receiver coil circuits for reducing the coupling factor between the first and second transmit and receiver coil circuits.

In one embodiment, the substrate defines a longitudinal axis separating the substrate into first and second sections on opposed sides of the longitudinal axis, the first inductive transmit and receiver coil circuit positioned on the first section of the substrate and the second inductive transmit and receiver coil circuit positioned on the second section of the substrate.

In one embodiment, the substrate includes first, second, third, and fourth sections, the first and second inductive transmit and receiver coil circuits positioned on separate ones of the first, second, third, and fourth sections of the substrate.

The present invention is also directed to a vehicle pedal assembly comprising a pedal housing, a rotatable pedal, and an inductive position sensor including an inductive target rotatable in response to the rotation of the pedal, a substrate positioned opposite the inductive target, a plurality of inductive transmit coil circuits defined on the substrate, and a plurality of inductive receiver coil circuits defined on the substrate and at least partially surrounded by the plurality of inductive transmit coil circuits respectively for reducing a coupling factor between the plurality of inductive transmit coil circuits.

In one embodiment, the substrate defines a plurality of substrate sections, the plurality of inductive transmit coil circuits and the plurality of inductive receiver coil circuits being positioned on different ones of the plurality of substrate sections.

In one embodiment, the substrate defines a longitudinal axis and first and second sections located on opposed sides of the longitudinal axis, a first one of the plurality of inductive transmit coil circuits and a first one of the plurality of inductive receiver coil circuits at least partially surrounded by the first one of the plurality of inductive transmit coil circuits being positioned on the first section of the substrate and a second one of the plurality of inductive transmit coil circuits and a second one of the plurality of inductive receiver coil circuits at least partially surrounded by the second one of the plurality of inductive transmit coil circuits being positioned on the second section of the substrate.

In one embodiment, the substrate defines first, second, third, and fourth sections and first, second, third, and fourth ones of the plurality of inductive transmit coil circuits and first, second, third, and fourth ones of the plurality of inductive receiver coil circuits at least partially surrounded by the first, second, third, and further ones of the plurality of inductive transmit coil circuits being positioned on the first, second, third, and fourth sections of the substrate respectively.

The present invention is further directed to an inductive position sensor comprising a substrate, a plurality of inductive transmit coil circuits defined on the substrate, and a plurality of inductive receiver circuits defined on the substrate and at least partially surrounded by the plurality of inductive transmit circuits respectively for reducing a coupling factor between the plurality of inductive transmit coil circuits.

In one embodiment, the substrate includes a plurality of substrate sections, the plurality of inductive transmit coil circuits and respective plurality of inductive receiver circuits at least partially surrounded by the plurality of inductive transmit circuits being located on the plurality of substrate sections respectively.

In one embodiment, the substrate defines a longitudinal axis and first and second substrate sections on opposed sides of the longitudinal axis and further comprising first and second inductive transmit coil circuits and first and second inductive receiver coil circuits at least partially surrounded by the first and second inductive transmit coil circuits and located on the respective first and second sections of the substrate on opposed sides of the longitudinal axis of the substrate.

In one embodiment, the substrate defines at least first, second, third, and fourth substrate sections and further comprising first, second, third and fourth inductive transmit coil circuits and first, second, third, and fourth inductive receiver coil circuits at least partially surrounded by the first, second, third, and fourth transmit coil circuits respectively and located on the first, second, third, and fourth substrate sections respectively.

There are other advantages and features of this invention which will be more readily apparent from the following description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENTS

Figure 1:
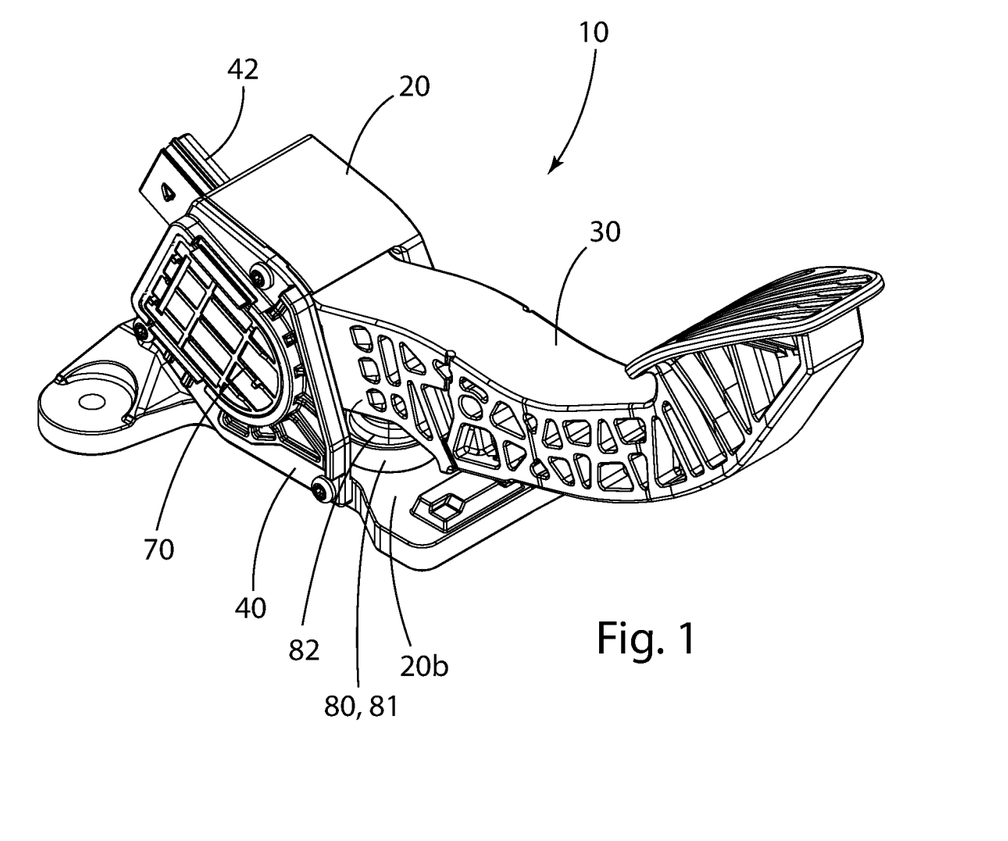
FIG. 1 is a perspective view of a vehicle accelerator pedal incorporating an inductive position sensor assembly in accordance with the present invention.
Figure 2:
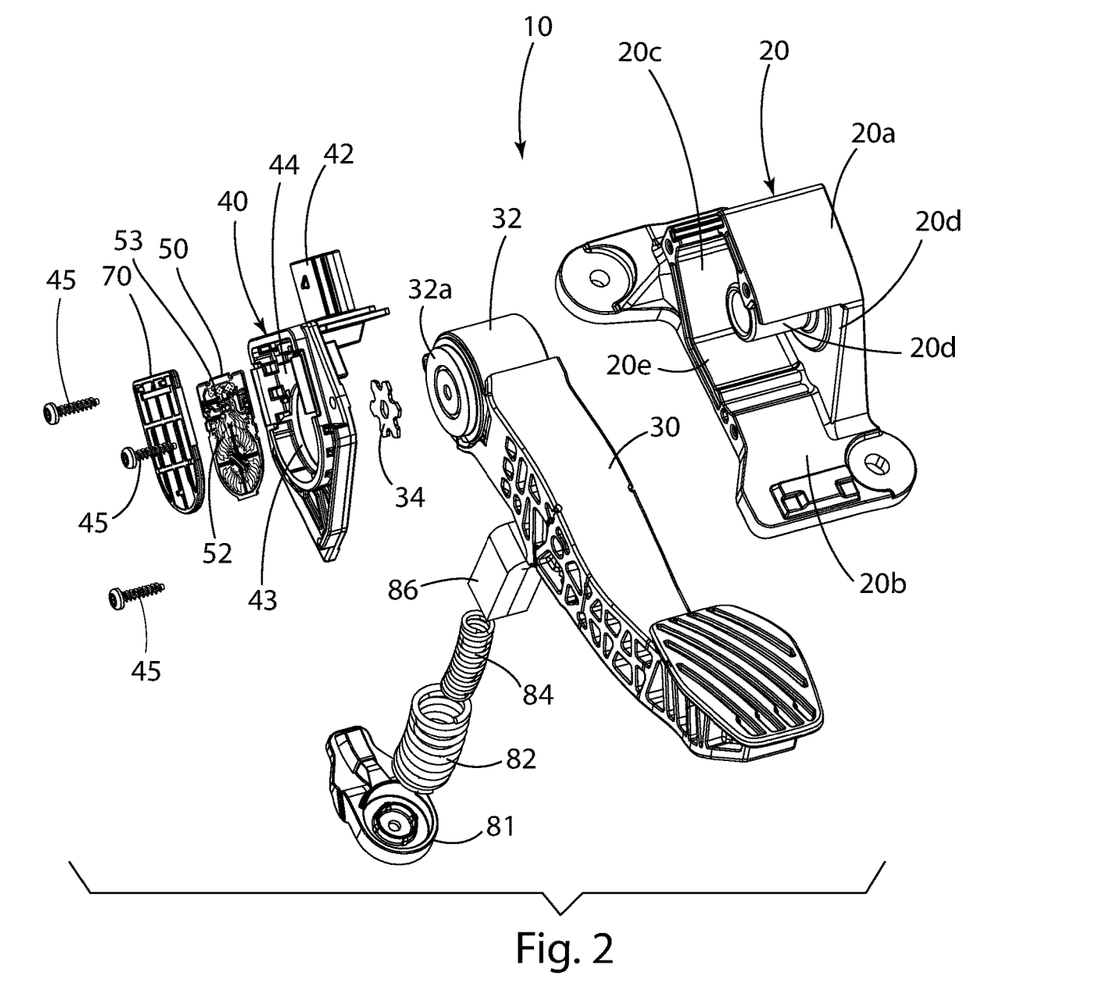
FIG. 2 is an exploded perspective view of the vehicle accelerator pedal shown in FIG. 1.

FIGS. 1 and 2 depict a vehicle accelerator pedal 10 with an inductive position sensor assembly in accordance with the present invention that incorporates a reduced coupling transmit and receiver coil circuit structure as described in more detail below.

The vehicle accelerator pedal 10 comprises a plastic pedal housing 20 including a plurality of exterior walls 20a and a base 20b together defining an interior 20c, a front opening 20d, and a side opening 20e.

The vehicle accelerator pedal 10 also comprises an elongate plastic pedal arm 30 that includes a distal end or drum 32 with a metal inductive sensor target 34 adapted to be over-molded into the exterior side face 32a of the drum 32. The pedal arm 30 and, more specifically, the distal end or drum 32 with the target 34 thereon extends into the interior 20c of the pedal housing 20 into a relationship rotatable relative to the housing 20 and more specifically into a relationship surrounding and rotatable relative to a shaft 20b integral with one of the side exterior walls 20a of the housing 20 and extending into the interior 20c of the housing 20.

The accelerator pedal 10 further comprises a combination plastic housing cover and electrical connector assembly 40 that is secured to the pedal housing 20 in a relationship covering and closing the housing side opening 20e and, more specifically, in a relationship covering the drum 32 of the pedal arm 30 located in the interior 20c of the housing 20 and, still more specifically, in a relationship opposed and spaced from the side exterior face 32a of the drum 32 of the pedal arm 30 with the inductive sensor target 34 overmolded therein. A plurality of screws 45 secure the cover 40 to the housing 20.

The housing cover 40 includes an integral electrical connector 42 and defines both a central circular opening 43 and an interior recess 44 surrounding the opening 42. The housing cover 40 and the pedal arm 30 are positioned relative to each other in a relationship with the target 34 on the drum 32 of the pedal arm 30 extending into and located in the circular opening 43 defined in the housing cover 40 when the housing cover 40 is secured to the housing 20.

The accelerator pedal 10 still further comprises an inductive position sensor substrate or printed circuit board 50 that includes opposed exterior faces 52 and 54 and which is insertable into and located and seated in the recess 44 defined in the housing cover 40 and positioned in a relationship opposed and adjacent the target 34 on the drum 32 of the pedal arm 30 and, still more specifically in the embodiment show, with the exterior face 54 of the substrate facing the target 34.

The substrate 50 includes respective inductive sensor transmit and receiver coil circuits defined and formed on the respective exterior front and back faces 52 and 54 as described in more detail below.

The accelerator pedal 10 still further comprises a plastic electrical cover or plate 70 that covers the inductive substrate 50 and is secured to the exterior face of the housing cover 40.

The accelerator pedal 10 additionally comprises a pedal friction assembly 80 located in the interior 20c of the housing 20. The pedal friction assembly 80 includes a friction device 81 seated on and adapted for pivotal movement relative to the base 22 of the pedal housing 20. A pair of telescoping springs 82 and 84 extend between the friction device 80 and the underside of the elongate pedal arm 30. A spring damper 86 is adapted to be wedged between the two springs 82 and 84.

The inductive position sensor assembly of the pedal 10 comprises the combination of the inductive position sensor target 34 on the drum 32 of the pedal arm 30 and the substrate 50 and associated transmit and receiver coil circuits as described in more detail below.

The application or removal of a foot force to and from the pedal arm 30 during the operation of a vehicle (not shown) results in the movement/rotation of the pedal arm 30 which in turn results in the movement/rotation of the pedal arm drum 32 in the interior 20c of the pedal housing 20 which results in the movement/rotation of the inductive sensor target 34 on the pedal arm drum 32.

The movement/rotation of the target 34 relative to the inductive position sensor transmit and receiver coil circuits defined and formed on the exterior side faces 52 and 54 of the substrate 50 results in a change in the magnetic field generated by the respective transmit coil circuits of the inductive position sensor which results in a change in the voltage in the respective receiver coil circuits of the inductive position sensor.

The change in voltage is sensed and converted by the associated inductive position sensor integrated circuitry into an electrical signal output for sensing and measuring the position of the pedal arm 30 and in turn for controlling the acceleration and deceleration of the vehicle.

FIGS. 3A and 3B depict the substrate 50 of an existing prior art dual output on-axis inductive position sensor assembly including inductive sensor transmit and receiver coil circuits 56, 58, 60, and 62 defined and formed on the opposed exterior faces 52 and 54 of the substrate 50.

In accordance with the prior art transmit/receiver coil circuit structure of FIGS. 3A and 3B, the transmit and receiver coil circuits 56 and 60 respectively on the exterior face 52 of the substrate 50 define and form a first inductive position sensor output or circuit and the transmit and receiver coil circuits 58 and 62 respectively on the opposed exterior face 54 of the substrate 50 define and form a second redundant inductive position sensor output circuit.

In FIGS. 3A and 3B, the first transmit coil circuit 56 is comprised of a plurality of transmit coil traces 56a defined and formed on the exterior face 52 of the substrate 50 while the second transmit coil circuit 58 is comprised of a plurality of receiver coil traces 58a defined on the opposed exterior face 54 of the substrate 50.

The first receiver coil circuit 60 is comprised of a plurality of receiver coil traces 60a defined on the exterior face 52 of the substrate 50 and the second receiver coil circuit 62 is comprised of a plurality of receiver coil traces 62a defined on the opposed exterior face 54 of the substrate 50.

Specifically, as shown in FIG. 3A, the first transmit coil circuit 56, and more specifically the first plurality of transmit coil circuit traces 56a thereof, extend in a circular, wheel-like pattern adjacent and spaced from the periphery or exterior circumferential edge of the exterior face 52 of the substrate 50 in a relationship at least partially surrounding the first receiver coil circuit 60 and, more specifically, in a relationship at least partially surrounding the first receiver coil circuit traces 60a which extend outwardly from the center of the substrate 50 in a spoke-like pattern relative to the transmit coil circuit 56 and respective traces 56a.

As shown in FIG. 3B, the second transmit coil circuit 58 on the opposed exterior face 54 of the substrate 50, and more specifically the second plurality of transmit coil circuit traces 58a thereof, extend in a circular, wheel-like pattern around the periphery or exterior circumferential edge of the opposed exterior face 54 of the substrate 50 in a relationship at least partially surrounding the second receiver coil circuit traces 62a which extend outwardly from the center of the substrate 50 in a spoke-like pattern relative to the transmit coil circuit 58 and respective traces 58a.

The substrate 50 of the prior art inductive position sensor depicted in FIGS. 3A and 3B is thus characterized in that the exterior side face 52 includes only one transmit coil circuit 56 and only one receiver coil circuit 60 defined and formed thereon and the opposed exterior face 54 includes only one transmit coil circuit 58 and only one receiver coil circuit 62 defined and formed thereon.

The substrate 50 of the prior art inductive position sensor depicted in FIGS. 3A and 3B is further characterized in that the respective transmit coil circuits 56 and 58 and, more specifically, the respective transmit coil circuit traces 56a and 58a on the respective opposed exterior faces 52 and 54 of the substrate 50 are positioned and located in an overlapping or back-to-black or opposed relationship relative to each other on the opposed faces 52 and 54 of the substrate 50 in which the respective transmit coil circuits 56 and 58 occupy the same respective overlapping or opposed regions or areas of the opposed substrate faces 52 and 54 and the respective receiver coil circuits 60 and 62 and, more specifically, the respective receiver coil circuit traces 60a and 62a on the respective opposed exterior faces 52 and 54 of the substrate are also positioned and located relative to each other in an overlapping or opposed or back-to-back relationship on the opposed faces 52 and 54 of the substrate 50 in which the respective receiver coil circuits 60 and 62 occupy the same respective overlapping or opposed regions or areas of the opposed substrate faces 52 and 54.

The overlapping relationship between the respective transmit 56 and 58 and receiver 60 and 62 coil circuits results in an increased coupling or coupling factor between the respective transmit coil circuits 56 and 58 and receiver 60 and 62 coil circuits. The coupling factor between the respective transmit coil circuits 56 and 58 is proportional to the mutual inductance between the respective transmit coil circuits 56 and 58 and the mutual inductance is proportional to the magnetic flux generated by the respective transmit coil circuits 56 and 58. The positioning and arrangement of the respective transmit coil circuits 56 and 58 and the respective receiver coil circuits 60 and 62 in an overlapping relationship on the opposed faces 52 and 54 of the substrate 50 results in an interaction and intermixing between the respective magnetic fields generated by the respective transmit coil circuits 56 and 58 which results in an increased coupling between the respective transmit coil circuits 56 and 58 and respective receiver coil circuits 60 and 62.

Thus, in the event of a short circuit or open circuit condition in one of the two redundant transmit circuits 56 or 58, the increased coupling between the transmit circuits 56 and 58 in the arrangement of FIGS. 3A and 3B in which the respective transmit circuits 56 and 58 and the respective receiver circuits 60 and 62 occupy the same opposed regions or areas of the opposed faces 52 and 54 of the printed circuit board 50 results in an interaction between the magnetic fields generated by the respective transmit coil circuits which increases the coupling between the respective transmit circuits 56 and 58 which disadvantageously increases the potential for malfunction of the non-short-circuited one of the transmit circuits 56 and 58.

Associated electrical circuitry, components, and output integrated circuits 53 on the respective opposed faces 52 and 54 of the substrate 50 are electrically coupled to the respective transmit and receiver coil circuit traces 56a, 58a, 60a, and 62a on the respective opposed faces 52 and 54 of the substrate 50.

FIGS. 4A and 4B depict a second embodiment of a prior art inductive position sensor comprising on-axis dual output inductive sensor transmit and receiver coil circuits 156, 158, 160 and 162 defined and formed on the opposed exterior faces 52 and 54 of the substrate 50.

In accordance with the prior art circuit structure of FIGS. 4A and 4B, the transmit and receiver coil circuits 156, 158, and 160 on the exterior face 52 of the substrate 50 in combination with the transmit and receiver coil circuits 156, 158, and 162 on the opposed exterior face 54 of the substrate 50 define and form respective first and second redundant inductive position sensors.

In the prior art embodiment shown in FIGS. 4A and 4B, the respective first and second transmit coil circuits 156 and 158 are defined and formed on each of the opposed exterior faces 52 and 54 of the substrate 50 and are each comprised of respective pluralities of transmit coil circuit traces 156a and 158*a* extending in an alternating circular or wheel-like pattern adjacent and spaced from the periphery or exterior edge of each of the respective exterior faces 52 and 54 of the substrate 50 in a relationship at least partially surrounding the respective first and second plurality of traces 160*a* and 160*b* of the respective receiver coil circuits 160 and 162 which extend outwardly from the center of the printed circuit 50 in a spoke-like patter relative to the respective traces 156*a* and 158*a* of the respective transmit coil circuits 156 and 158.

The substrate 50 of the prior art inductive position sensor depicted in FIGS. 4A and 4B is thus characterized in that the exterior face 52 of the substrate 50 includes only one receiver coil circuit 160 at least partially surrounded by the traces 156*a* and 158*a* of the respective transmit coil circuits 156 and 158 and the opposed exterior face 54 of the substrate 50 includes only one receiver coil circuit 162 at least partially surrounded by the traces 156*a* and 158*a* of the respective transmit coil circuits 156 and 150 on the exterior face 54 of the substrate 50.

The substrate 50 of the prior art inductive position sensor depicted in FIGS. 4A and 4B is further characterized in that the respective transmit coil circuits 156 and 158 and, more specifically, the respective transmit coil circuit traces 156*a* and 158*a* on the respective opposed exterior faces 52 and 54 of the substrate 50 are positioned and located in an overlapping or back-to-back or opposed area relationship relative to each other on the opposed faces 52 and 54 of the substrate 50 in which the respective transmit coil circuits 156 occupy the same regions or areas on the respective substrate opposed faces 52 and 54 and the respective receiver coil circuits 60 and 62 and, more specifically, the respective receiver coil circuit traces 160*a* and 162*a* on the respective opposed exterior faces 52 and 54 of the substrate 50 are also positioned and located relative to each other and the respective transmit coil circuits 156 and 158 in relationship on the opposed faces 52 and 54 of the substrate 50 in which the respective receiver coil circuits 60 and 62 are positioned in a back-to-back or overlapping or opposed relationship occupying the same back-to-back and overlapping regions or areas of the respective substrate opposed faces 52 and 54.

The overlapping relationship between the respective transmit 156 and 158 and receiver 160 and 162 coil circuits results in an increased coupling or coupling factor between the respective transmit coil circuits 156 and 158 and receiver 160 and 162 coil circuits. The coupling factor between the respective transmit coil circuits 156 and 158 is proportional to the mutual inductance between the respective transmit coil circuits 156 and 158 and the mutual inductance is proportional to the magnetic flux generated by the respective transmit coil circuits 156 and 158. The positioning and arrangement of the respective transmit coil circuits 156 and 158 and the respective receiver coil circuits 160 and 162 in an overlapping planar area relationship on the opposed faces 152 and 154 of the substrate 50 results in an interaction and intermixing between the respective magnetic fields generated by the respective transmit coil circuits 156 and 158 which results in an increased coupling between the respective transmit coil circuits 156 and 158 and respective receiver coil circuits 160 and 162.

Thus, in the event of a short circuit or open circuit condition in one of the two redundant transmit circuits 156 or 158, the increased coupling between the transmit circuits 156 and 158 in the arrangement of FIGS. 4A and 4B in which the respective transmit circuits 156 and 158 and the respective receiver circuits 160 and 162 are positioned or arranged on the opposed faces 52 and 54 of the substrate 50 in a overlapping relationship in which the respective circuits occupy the same regions or areas of the same or opposed faces 52 and 54 of the printed circuit board 50 results in an interaction between the magnetic fields generated by the respective transmit coil circuits which increases the coupling between the respective transmit circuits 156 and 158 which disadvantageously increases the potential for malfunction of the non-short-circuited one of the transmit circuits 156 and 158.

Associated electrical circuitry, components, and output integrated circuits 53 on the respective opposed faces 52 and 54 of the substrate 50 is electrically coupled to the respective transmit and receiver coil circuit traces 156*a*, 158*a*, 160*a*, and 162*a* on the respective opposed faces 52 and 54 of the substrate 50.

Figure 5A:
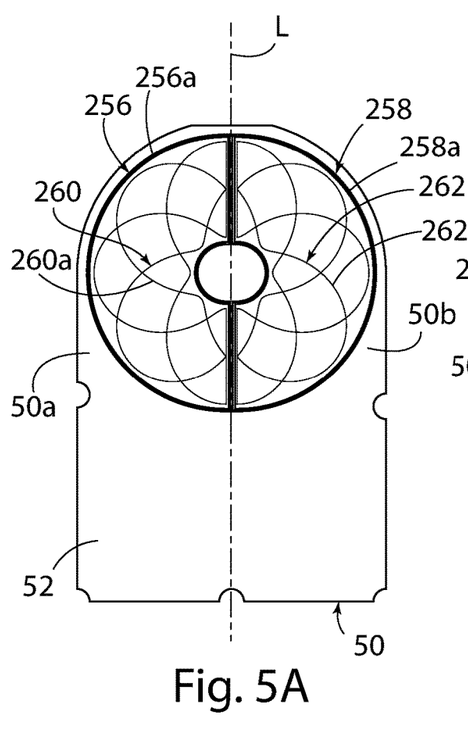
FIG. 5A is a plan view of the inductive transmit/receiver coil circuits on the front exterior face of a substrate of an inductive position sensor in accordance with the present invention.
Figure 5B:
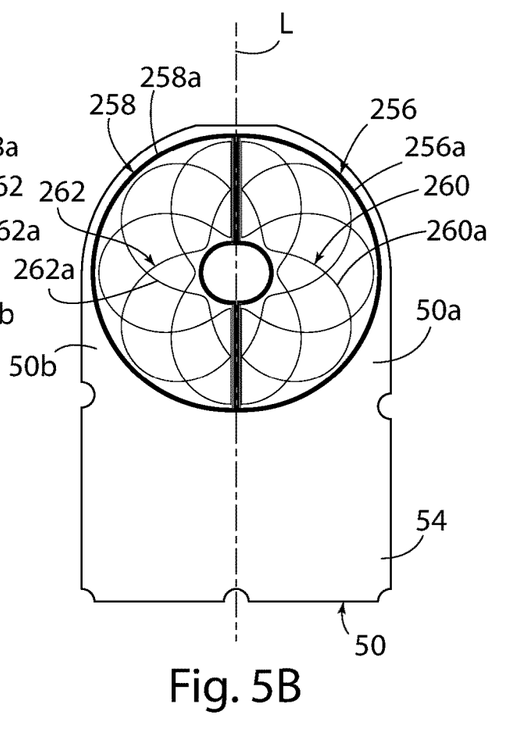
FIG. 5B is a plan view of the inductive transmit/receiver coil circuits on the opposed back exterior face of the substrate of the inductive position sensor shown in FIG. 5A.

FIGS. 5A and 5B depict a simplified first embodiment of an inductive position sensor assembly in accordance with the present invention which comprises on-axis dual output inductive sensor transmit and receiver coil circuits 256, 258, 260, and 262 defined and formed on the front and back exterior faces 52 and 54 of the substrate 50 as described in more detail below.

Although not shown in FIGS. 5A and 5B for simplification purposes, it is understood that the exterior faces 52 and 54 of the substrate 50 include associated electrical circuitry, components, and output integrated circuits 53 as shown in for example FIGS. 3A and 3B.

As shown in FIG. 5A, a first transmit coil circuit 256, and more specifically a first plurality of transmit coil circuit traces 256*a* thereof, extend in a semi-circular pattern on a first substrate section 50*a* in a relationship surrounding a first receiver coil circuit 260 and, more specifically, in a relationship surrounding a first plurality of the receiver coil circuit traces 260*a* of the first receiver coil circuit 260.

Moreover, a second transmit coil circuit 258, and more specifically a second plurality of transmit coil circuit traces 258*a* thereof, extend in a semi-circular pattern on a second substrate section 50*b* which is opposed to the first substrate section 50*a* in a relationship surrounding a second receiver coil circuit 262 and, more specifically, in a relationship surrounding a second plurality of the receiver coil traces 262*a* of the second receiver coil circuit 262.

As shown in FIG. 5B, the opposed exterior face 54 of the substrate 50 includes a plurality of transmit/receiver coil circuits similar in pattern, structure, elements, and location to the pattern, structure, elements, and location of the transmit/receiver coil circuits 256, 258, 260, and 262 on the exterior face 52 of the substrate 50 and thus the description above with respect to the pattern, structure, elements, and location of the transmit/receiver coil circuits 256, 258, 260, and 262 on the substrate face 52 as shown in FIG. 5A is incorporated herein by reference as though fully set forth herein with respect to the pattern, structure, elements, and location of the transmit/receiver coil circuits 256, 258, 260, and 262 on the substrate exterior face 54 as shown in FIG. 5B.

The inductive position sensor of the present invention as shown in FIGS. 5A and 5B is thus characterized in that the first and second semi-circular shaped transmit coil circuits 256 and 258 and the associated first and second receiver coil circuits 260 and 262 surrounded by the respective transmit coil circuits 256 and 258 are positioned in a diametrically opposed and separate relationship on opposed separate and non-overlapping sections or regions or areas or sections 50*a* and 50*b* of the substrate 50 and, more specifically, are positioned in a diametrically opposed and separate relationship on different and non-overlapping sections or regions or areas or sections 50a and 50b of the substrate 50 defined and located on opposite sides of the central longitudinal axis L of the substrate 50.

Still more specifically, the inductive position sensor of the present invention as shown in FIGS. 5A and 5B is characterized in that each of the exterior side faces 52 and 54 of the substrate 50 includes a plurality of, and more specifically first and second, receiver coil circuits 260 and 262 defined and formed on respective separate and different first and second sections or regions 50a and 50b of the substrate 50 located on opposed sides of the longitudinal axis L of the substrate 50.

The transmit coil circuit 256 in combination with the respective receiver circuit 260 on the opposed substrate faces 52 and 54 are electrically coupled together and define and form a first one of two redundant output inductive sensor circuits while the transmit coil circuit 258 and the respective receiver coil circuit 262 on the opposed substrate faces 52 and 54 are electrically coupled together and define and form a second one of two redundant output inductive sensor circuits in the on-axis, dual output sensor application for which the present invention is particularly suited including, for example, a dual output pedal position application.

Figure 6A:
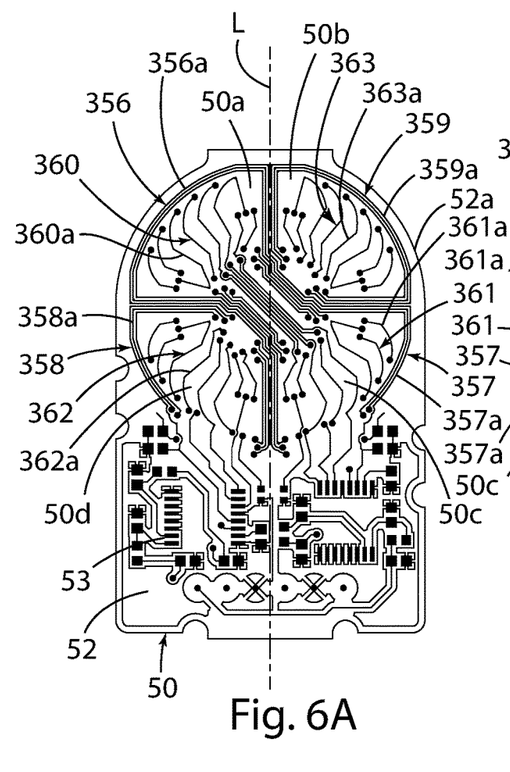
FIG. 6A is a plan view of the inductive transmit/receiver coil circuits on the front exterior face of a substrate of another inductive position sensor in accordance with the present invention.
Figure 6B:
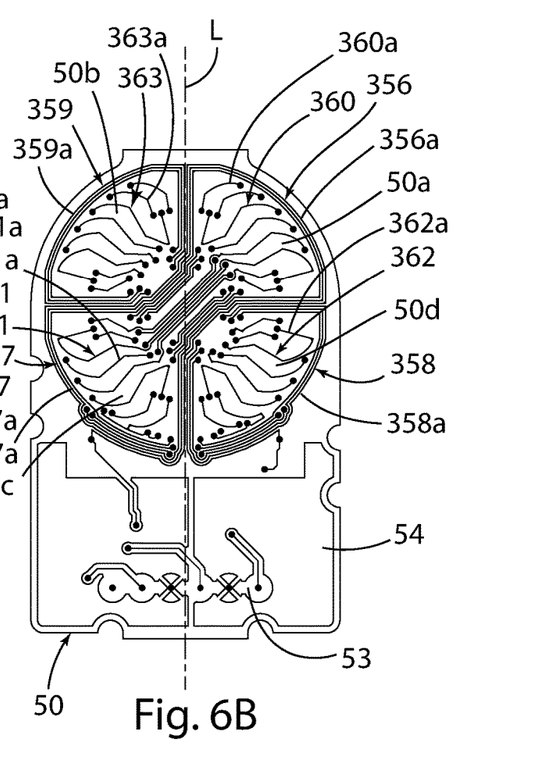
FIG. 6B is a plan view of the inductive transmit/receiver coil circuit on the opposed back exterior face of the substrate of the inductive position sensor shown in FIG. 6A.

FIGS. 6A and 6B depict another embodiment of an inductive position sensor in accordance with the present invention in which the inductive position sensor substrate 50 includes inductive on-axis dual output sensor transmit and receiver coil circuits 356, 357, 358, 359, 360, 361, 362, and 363 defined and formed on the opposed exterior faces 52 and 54 of the substrate 50 and, more specifically, an embodiment in which each of the exterior side faces 50 and 52 of the substrate 50 includes a plurality of, and more specifically four, transmit and receiver coil circuits 356, 357, 358, 359, 360, 361, 362, and 363 defined and formed on a plurality of, and more specifically four, different and separate sections or regions or areas or quadrants 50a, 50b, 50c, and 50d of the substrate 50 as described in more detail below.

Associated electrical circuitry, components, and output integrated circuits 53 on the respective opposed faces 52 and 54 of the substrate 50 are electrically coupled to the respective transmit and receiver coil circuit traces 356a, 357a, 358a, 359a, 360a, 361a, 362a, and 363a on the respective opposed faces 52 and 54 of the substrate 50.

In the embodiment as shown in FIG. 6A, the exterior face 52 of the substrate 50 includes a first pair of generally quarter-circular or pie-shaped transmit coil circuits 356 and 357 each including a plurality of transmit coil circuit traces 356a and 357a and a second pair of generally quarter-circular transmit coil circuits 358 and 359 each including a plurality of transmit coil circuit traces 358a and 359a extending around the exterior face 52 of the housing 50 in an alternating relationship with each of the transmit coil circuits 356, 357, 358, and 359 at least partially surrounding respective ones of the receiver coil circuits 360, 361, 362 and 364.

Specifically, in the embodiment as shown in FIG. 6A, the first pair of transmit coil circuits 356 and 357 are positioned in a diametrically opposed relationship relative to each other and the second pair of transmit coil circuits 358 and 359 are positioned in a diametrically opposed relationship relative to each other with the transmit coil circuit 358 positioned between the first pair of transmit coil circuits 356 and 357 and the transmit coil circuit 359 positioned between the first pair of transmit coil circuits 356 and 357.

Thus, in the embodiment of FIG. 6A, the respective generally pie-shaped transmit coil circuits 356, 357, 358, and 359 extend around the exterior face 52 of the substrate 50 in a relationship positioned and seated on the respective separate and different non-overlapping planar sections or regions or areas or quadrants 50a, 50b, 50c, and 50d of the substrate 50 and, more specifically, with the transmit coil circuit 356 positioned and formed on the substrate section 50a, the transmit coil circuit 359 positioned and formed on the substrate section 50b, the transmit coil circuit 357 positioned and formed on the substrate section 50c, and the transmit coil circuit 358 positioned and formed on the substrate section 50d.

Moreover, in the embodiment of FIG. 6A, the exterior face 52 of the substrate 50 includes a plurality of, and in the embodiment shown four, respective receiver coil circuits 360, 361, 362, and 363 and, more specifically, a plurality of, and in the embodiment shown four, respective pluralities of receiver coil circuit traces 360a, 361a, 362a, and 363a defined and formed and positioned on the exterior face 52 of the substrate 50 in a relationship at least partially surrounded by the respective transmit coil circuits 356, 357, 358 and 359 and, more specifically, in a relationship at least partially surrounded by the respective transmit coil circuit traces 356a, 357a, 358a, and 359a of the respective transmit coil circuits 356, 357, 358, and 359.

In the embodiment shown, two of the substrate sections or quadrants 50a and 50d and two of the respective transmit/receiver coil circuits 356, 358, 360, and 362 defined and positioned thereon are located on a first side of the longitudinal axis L of the substrate 50 and the two other substrate sections or quadrants 50b and 50c and the other two respective transmit/receiver coil circuits 357, 359, 361, and 363 defined and positioned thereon are located on a second opposed side of the longitudinal axis L of the substrate 50 and in a diametrically opposed relationship to the substrate sections 50a and 50d and respective transmit/receiver coil circuits 356, 358, 360, and 362.

As shown in FIG. 6B, the opposed exterior face 54 of the substrate 50 includes a plurality of transmit/receiver coil circuits 356, 357, 358, 359, 360, 361, 362, and 363 that are located on separate and different sections or areas or quadrants 50a, 50b, 50c, and 50d of the substrate 50 and are similar in pattern, structure, elements, and location to the pattern, structure, elements, and location of the transmit/receiver coil circuits 356, 357, 358, 359, 360, 361, 362, and 363 on the exterior face 52 of the substrate 50.

The description above with respect to FIG. 6A in connection with the pattern, structure, elements, and location of the transmit/receiver coil circuits 356, 357, 358, 359, 360, 361, 362, and 363 on the exterior face 52 of the substrate 50 is incorporated herein by reference as though fully set forth herein with respect to the pattern, structure, elements, and location of the transmit/receiver coil circuits 356, 357, 358, 359, 360, 361, 362, and 363 on the opposed exterior face 54 of the substrate 50 as shown in FIG. 6B.

The inductive sensor coil circuits as shown in FIGS. 5A, 5B, 6A, and 6B and described above are suited for use in on-axis dual/redundant output applications.

In FIGS. 5A and 5B, the respective first transmit coil circuit 256 and first receiver coil circuit 260 on each of the respective exterior faces 52 and 54 of the substrate 50 are positioned in an overlapping or back-to-back or opposed relationship occupying the same overlapping or opposed regions or areas of the opposed faces 52 and 54 of the substrate 50 and define and form a first inductive output sensor circuit of the inductive sensor of the present invention.

Further, in FIGS. 5A and 5B, the respective second transmit coil circuit 258 and second receiver coil circuit 262 on each of the respective exterior faces 52 and 54 of the substrate 50 are positioned in an overlapping or back-to-back or opposed relationship occupying the same overlapping or opposed or back-to-back regions or areas or sections of the opposed faces 52 and 54 of the substrate 50 and define and form a second redundant inductive output sensor circuit of the inductive sensor of the present invention.

In accordance with the present invention, the transmit and receiver coil circuits 256 and 260 on the opposed substrate faces 52 and 54 define the first inductive sensor circuit and the transmit and receiver coil circuits 258 and 262 defining the second inductive sensor circuit of the inductive position sensor of the present invention and occupy different and non-overlapping regions or areas of the opposed faces 52 and 54 of the substrate 50 to reduce coupling between the respective first and second inductive sensor circuits of the inductive sensor of the present invention as shown in FIGS. 5A and 5B.

In FIGS. 6A and 6B, the respective first transmit coil circuits 356 and 357 in combination with the respective receiver coil circuits 360 and 361 on the respective opposed faces 52 and 54 of the substrate 50 are positioned relative to each other in an overlapping or back-to-back relationship occupying the same overlapping regions or areas or quadrants of the opposed faces 52 and 54 of the substrate 50 and are electrically coupled together to form the first one of the two inductive output sensor circuits of the inductive sensor of the present invention.

Further, in FIGS. 6A and 6B, the respective second transmit coil circuits 358 and 359 in combination with the respective receiver coil circuits 362 and 363 on the respective exterior faces 52 and 54 of the substrate 50 are positioned relative to each other in an overlapping or back-to-back or opposed relationship occupying the same overlapping or opposed regions or areas or quadrants or sections of the opposed faces 52 and 54 of the substrate 50 and define and are electrically coupled together to form the second one of the redundant inductive output sensor circuits of the inductive position sensor in accordance with the present invention.

In accordance with the present invention, the respective first transmit coil circuits 356 and 357 with the respective receiver coil circuits 360 and 361 of the first redundant inductive output sensor circuit are positioned on regions or areas or quadrants of the opposed faces 52 and 54 of the substrate 50 different and not overlapping with the regions or areas or quadrants of the opposed faces 52 and 54 of the substrate 50 occupied by the respective second transmit coil circuits 358 and 359 and respective receiver coil circuits 362 and 363 of the second redundant inductive output sensor circuit to reduce coupling between the respective transmit and receiver coil circuits of the respective first and second inductive output circuits.

Specifically, in accordance with the present invention and unlike the prior art substrate designs depicted in FIGS. 3A, 3B, 4A, and 4B, the positioning, arrangement, geometry, and/or design of the respective redundant first and second inductive sensor transmit and receiver coil circuits of the inductive sensor of the present invention as shown in FIGS. 5A, 5B, 6A, and 6B on separate and different non-overlapping sections or areas or regions or quadrants of the substrate 50 as described in detail above with the respective receiver coil circuits at least partially surrounded by the respective transmit coil circuits advantageously creates a separation between the traces of the respective transmit and receiver coil circuits and advantageously results in a reduced interaction or intermixing or interference between the respective magnetic fields generated by the respective non-overlapping transmit coil circuits of the respective first and second inductive sensor circuits which results in a reduced coupling/reduced coupling factor between the respective transmit coil circuits of the respective first and second inductive sensor circuits.

The reduced coupling between the respective transmit coil circuits of the respective redundant first and second inductive sensor circuits of the inductive position sensor of the present invention reduces the possibility of interference with the function or effectiveness of the respective transmit coil circuits of the respective redundant first and second inductive sensor circuits in the event of, for example, a short circuit in one of the redundant transmit and receiver coil circuits. As a result, there is reduced risk of interference in the function or effectiveness of the non-shorted one of the redundant transmit and receiver coil circuits.

Numerous variations and modifications of the positioning, arrangement, geometry, and design of the inductive sensor coil circuits as described above may be effected without departing from the spirit and scope of the novel features of the invention. It is, of course, intended to cover by the appended claims all such modifications as fall within the scope of the claims.

For example, it is thus understood that no limitations with respect to the positioning, arrangement, geometry, and design of the inductive sensor coil circuits defined and formed on the substrate of the inductive position sensor is intended or should be inferred and includes, for example, embodiments in which the respective transmit coil circuits are other than semi-circular or pie-shaped.

We claim:

1. A vehicle pedal assembly comprising:
   a pedal housing;
   a rotatable pedal; and
   an inductive position sensor including:
      an inductive target rotatable in response to the rotation of the pedal;
      a substrate positioned opposite the inductive target, the substrate including first and second substrate sections on opposed sides of a longitudinal axis of the substrate;
      first and second inductive transmit coil circuits defined and located on the first and second substrate sections respectively; and
      first and second inductive receiver coil circuits defined and located on the first and second substrate sections respectively and the first inductive receiver coil circuit at least partially surrounded by the first inductive transmit coil circuits and the second inductive receiver coil circuit at least partially surrounded by the second inductive transmit coil circuit for reducing a coupling factor between the first and second inductive transmit coil circuits.

2. The vehicle pedal assembly of claim 1, wherein the first inductive transmit coil circuit includes a plurality of transmit coil circuit traces that extend in a semi-circular pattern on the first substrate section.

3. The vehicle pedal assembly of claim 1, wherein the first inductive transmit coil circuit surrounds the first receiver coil circuit.

4. The vehicle pedal assembly of claim 1, wherein the first receiver coil circuit includes a plurality of first receiver coil circuit traces, and the first inductive transmit coil circuit surrounds the plurality of first receive coil circuit traces.

5. The vehicle pedal assembly of claim 1, wherein the substrate includes output integrated circuits.

6. A vehicle pedal assembly comprising:
a pedal housing;
a rotatable pedal; and
an inductive position sensor including:
- an inductive target rotatable in response to the rotation of the pedal;
- a substrate defining first, second, third, and fourth substrate sections;
- first, second, third, and fourth inductive transmit coil circuits located on the first, second, third and fourth substrate sections respectively; and
- first, second, third, and fourth inductive receiver coil circuits positioned on the first, second, third, and fourth substrate sections respectively and at least partially surrounded by the first, second, third, and fourth inductive transmit coil circuits respectively.

7. The vehicle pedal assembly of claim 6, wherein the first, second, third and fourth inductive transmit coil circuits are quarter-circular or pie-shaped transmit coil circuits.

8. The vehicle pedal assembly of claim 6, wherein the first, second, third and fourth inductive transmit coil circuits are positioned non-overlapping on the first, second, third and fourth substrate sections.

9. The vehicle pedal assembly of claim 6, wherein the first, second, third and fourth inductive transmit coil circuits each include a plurality of transmit coil circuit traces.

10. The vehicle pedal assembly of claim 6, wherein the first and second substrate sections are located on a first side of a longitudinal axis of the substrate, and wherein the third and fourth substrate sections are located on a second opposed side of the longitudinal axis.

11. An inductive position sensor comprising:
a substrate including first and second substrate sections on opposed sides of a longitudinal axis of the substrate;
first and second inductive transmit coil circuits defined and located on the first and second substrate sections respectively; and
first and second inductive receiver coil circuits defined and located on the first and second substrate sections respectively and at least partially surrounded by the first and second inductive transmit coil circuits respectively for reducing a coupling factor between the first and second inductive transmit coil circuits.

12. The inductive position sensor of claim 11, wherein the first inductive transmit coil circuit includes a plurality of transmit coil circuit traces that extend in a semi-circular pattern on the first substrate section.

13. The inductive position sensor of claim 11, wherein the first inductive transmit coil circuit surrounds the first receiver coil circuit.

14. The inductive position sensor of claim 11, wherein the first receiver coil circuit includes a plurality of first receiver coil circuit traces, and the first inductive transmit coil circuit surrounds the plurality of first receive coil circuit traces.

15. The inductive position sensor of claim 11, wherein the substrate includes output integrated circuits.

16. An inductive position sensor comprising:
a substrate defining at least first, second, third, and fourth substrate sections;
first, second, third and fourth inductive transmit coil circuits located on the first, second, third and fourth substrate sections respectively; and
first, second, third, and fourth inductive receiver coil circuits located on the first, second, third, and fourth substrate sections respectively and at least partially surrounded by the first, second, third, and fourth inductive transmit coil circuits respectively for reducing a coupling factor between the first, second, third and fourth inductive transmit coil circuits.

17. The inductive position sensor of claim 16, wherein the first, second, third and fourth inductive transmit coil circuits are quarter-circular or pie-shaped transmit coil circuits.

18. The inductive position sensor of claim 16, wherein the first, second, third and fourth inductive transmit coil circuits are positioned non-overlapping on the first, second, third and fourth substrate sections.

19. The inductive position sensor of claim 16, wherein the first, second, third and fourth inductive transmit coil circuits each include a plurality of transmit coil circuit traces.

20. The inductive position sensor of claim 16, wherein the first and second substrate sections are located on a first side of a longitudinal axis of the substrate, and wherein the third and fourth substrate sections are located on a second opposed side of the longitudinal axis.

* * * * *

UNITED STATES PATENT AND TRADEMARK OFFICE
CERTIFICATE OF CORRECTION

PATENT NO. : 11,614,765 B2
APPLICATION NO. : 17/171108
DATED : March 28, 2023
INVENTOR(S) : Tad L. Miller It is certified that error appears in the above-identified patent and that said Letters Patent is hereby corrected as shown below:

In the Claims

Column 12, Claim 1, Line 50:
Replace "transmit coil circuits" with --transmit coil circuit--.

Column 14, Claim 14, Line 11:
Replace "receive" with --receiver--.

Signed and Sealed this
Second Day of July, 2024

Katherine Kelly Vidal
*Director of the United States Patent and Trademark Office*